United States Patent
Shiomi et al.

(10) Patent No.: US 6,751,182 B1
(45) Date of Patent: Jun. 15, 2004

(54) HEAD FEED MECHANISM FOR DISK DRIVE APPARATUS

(75) Inventors: Tetsuhiro Shiomi, Kanagawa (JP); Tomoaki Morishita, Shizuoka (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/466,176

(22) Filed: Dec. 17, 1999

(30) Foreign Application Priority Data

Dec. 25, 1998 (JP) .......................................... P10-370845

(51) Int. Cl.$^7$ .............................................. G11B 21/02
(52) U.S. Cl. ...................................................... 369/219
(58) Field of Search ............................... 369/219, 77.1, 369/77.2, 13, 192, 75.1, 75.2

(56) References Cited

U.S. PATENT DOCUMENTS

| | | | | |
|---|---|---|---|---|
| 4,829,508 A | | 5/1989 | Arita ........................... 369/215 |
| 4,875,120 A | * | 10/1989 | Takahashi et al. ........ 360/267.7 |
| 5,172,361 A | * | 12/1992 | Urushibata et al. ......... 369/77.1 |
| 5,452,271 A | * | 9/1995 | Ohmori et al. ............... 369/13 |
| 5,608,705 A | * | 3/1997 | Tanaka ....................... 369/77.1 |
| 5,943,309 A | * | 8/1999 | Watanabe .................. 369/77.1 |
| 5,995,479 A | * | 11/1999 | Takizawa et al. ........... 369/219 |
| 6,058,097 A | * | 5/2000 | Inoue ......................... 369/192 |
| 6,208,606 B1 | * | 3/2001 | Saito .......................... 369/77.1 |
| 6,219,314 B1 | * | 4/2001 | Versleegers .............. 369/30.86 |

FOREIGN PATENT DOCUMENTS

| | | | |
|---|---|---|---|
| EP | 0 351 953 | | 1/1990 |
| EP | 0 717 400 A1 | | 6/1996 |
| EP | 0 806 767 A | | 11/1997 |
| EP | 0 869 493 A2 | | 10/1998 |
| JP | 7-254240 | | 10/1995 |
| JP | 10-162522 | | 6/1998 |
| JP | 2000-195063 | * | 7/2000 |
| JP | 2000-207853 | * | 7/2000 |
| JP | 2001-101673 A | * | 4/2001 |

OTHER PUBLICATIONS

European Search Report Jan. 2, 2002 and Annex.
Patent Abstracts of Japan, vol. 014, No. 419, Sep. 10, 1990.
Patent Abstracts of Japan, vol. 15, No. 402, Oct. 14, 1991.
Patent Abstracts of Japan, vol. 10, Oct. 31, 1996.
Patent Abstracts of Japan, vol. 11, No. 358, Nov. 21, 1987.
Patent Abstracts of Japan, vol. 12, No. 323, Sep. 2, 1988.
Patent Abstracts of Japan, vol. 11, Sep. 30, 1998.

* cited by examiner

*Primary Examiner*—Brian E. Miller
*Assistant Examiner*—Tianjie Chen
(74) *Attorney, Agent, or Firm*—Rader, Fishman & Grauer PLLC; Ronald P. Kananen

(57) ABSTRACT

A disk drive apparatus for recording (writing) and/or reproducing (reading) an information signal by rotating an optical disk, and moving an optical pick-up device along an information recording face of the optical disk. A base chassis rotationally supports a turntable on which the optical disk is loaded. A head feed mechanism suitable for use in the disk drive apparatus includes a pick-up feed mechanism having a feed shaft for moving the optical pick-up device toward and away from the turntable. A bearing portion of the feed shaft is provided integrally with the base chassis.

3 Claims, 14 Drawing Sheets

HEAD FEED MECHANISM FOR DISK DRIVE APPARATUS

BACKGROUND OF THE INVENTION

1. Field of the Invention

The present invention relates to a disk drive apparatus for recording (writing) and/or reproducing (reading) an information signal by rotating an optical disk, and moving an optical pick-up device along an information recording face of the optical disk. More particularly, the invention relates to a head feed mechanism suitable for use in the disk drive apparatus.

2. Description of Related Art

Optical disk drive apparatuses for recording and/or reproducing information to and/or from an optical disk are conventionally known. The so-called optical disk may be, for example, a CD (compact disk), a CD-ROM (read only memory) or the like, or an optical magnetic disk (OD) or the like. In the conventional disk drive apparatus, an optical disk is horizontally loaded onto a turntable, fixed to a rotary shaft of a spindle motor, and is rotated. Simultaneously, a laser beam is vertically irradiated on an information recording face of the optical disk by means of an optical head of an optical pick-up device. By moving the optical head from the center of the optical disk toward its outside, in the radial direction, the information signal is written to the information recording face and the information signal previously recorded on the information recording face is read out.

In such a disk drive apparatus, it is necessary to attach, within a predetermined tilt range, the information recording face of the optical disk, on which the information signal is recorded, and the optical head of the optical pick-up device, provided for reading the information. The reason is that the tilt of the optical head greatly affects the reproduction accuracy of the information signal. In this case, it is desired that an optical axis of an objective lens of the optical head should be set perpendicular with respect to the information recording face. Doing so allows recording on and/or reproduction from the optical disk with high density and precision. However, the tilt of the optical disk, the alignment of the spindle motor, and the alignment of the objective lens and the like, have variations. Therefore, it is difficult to precisely set the optical axis of the objective lens perpendicular with respect to the information recording face.

For this reason, in the disk drive apparatus in which the optical disk such as a CD, a CD-ROM or the like is used as an information recording medium, the standard tolerance of a relative tilt angle between the optical disk and the objective lens is unified within a range of 1.2° or less (the standard tilt angle of the optical disk ranges within 0.6° or less, and the standard tilt angle of each of the spindle motor and the objective lens on the optical disk device side ranges within 0.6° or less). With a state in which the optical disk is fixed in a predetermined position as a reference, the optical pick-up device is tilted, thereby adjusting the optical axis of the objective lens within the range of a determined tilt.

A disk drive apparatus having such a disk tilt mechanism is shown, for example, in FIG. 14. The disk drive apparatus 1 comprises a spindle chassis 2 formed of a plate-shaped frame member having an almost square opening formed on the inside thereof, and a pick-up chassis 3 formed of a plate-shaped frame member having an opening formed therein. The pick-up chassis 3 is slightly smaller than that of the spindle chassis 2. The pick-up chassis 3 is provided with a pair of shaft portions 3a projecting from both sides in the left to right direction, while the spindle chassis 2 is provided with a pair of bearing portions 2a for rotationally supporting the shaft portions 3a. By the combination of the pair of bearing portions 2a and the shaft portions 3a, the pick-up chassis 3 is rotationally supported in the front to rear direction with respect to the spindle chassis 2.

A tilt driving mechanism 4 is provided on one side of the spindle chassis in the front to rear direction. By the actuation of the tilt driving mechanism 4, the pick-up chassis 3 is rotated in the front to rear direction of the spindle chassis 2. A spindle motor 5 is fixed, with its rotary shaft turned upward, on the other side, in the front to rear direction, of the spindle chassis 2. A turntable 6, on which the optical disk is to be loaded, is fixed integrally with the rotary shaft of the spindle motor 5.

A guide shaft 3b and a guide portion (not shown) are fixed to the pick-up chassis 3 in parallel with each other at a predetermined interval so as to be extended in the front to rear direction. A slide member 8 of an optical pick-up device 7 is slidably supported on the guide shaft 3b and the guide portion, and a rack (not shown) is fixed to the slide member 8. A gear positioned at an end of a head feed mechanism 9 is engaged with the rack. By driving the head feed mechanism 9 to transmit a rotary force to the slide member 8, the optical pick-up device 7 is moved toward and away from the turntable 6.

Additionally, a tilt sensor 10, which detects the tilt angle of the information recording face of the optical disk loaded on the turntable 6, is mounted on the slide member 8. The tilt sensor 10 emits a light toward the information recording face, and detects the warp of the optical disk on receipt of the light reflected by the information recording face. Based on the result of the detection of the tilt sensor 10, the tilt of the pick-up chassis 3 can be changed. Adjusting the pick-up chassis 3 tilt thereby adjusts the tilt of the optical axis of an optical head 7a of the optical pick-up device 7 with respect to the tilt of the information recording face.

In such a conventional disk drive apparatus, however, a pair of guide shafts 3b and guide portions movably support the optical pick-up device 7. The rack attached to the slide member 9 of the optical pick-up device 7 is engaged with the gear, at the end of the head feed mechanism 9, provided in the pick-up chassis 3. The driving force of the head feed mechanism 9 is transmitted to the rack, thereby moving the optical pick-up device 7 toward and away from the turntable 6. Therefore, a reduction gear having a plurality of gears is required, and the number of parts to be used increases, thus the structure is non-economical. Moreover, the size of the whole device is increased.

Therefore, to eliminate the above-mentioned drawbacks, a feed mechanism utilizing the combination of a stepping motor and a feed shaft has been provided. With this feed mechanism, the stepping motor is coupled to the feed shaft, thereby making the axial direction of the feed shaft coincident with that of the rotary shaft of the stepping motor. The stepping motor is fixed to a pick-up chassis through a motor holder and the tip end portion of the feed shaft is rotationally supported on the pick-up chassis via a separate bearing member. Accordingly, with such a feed mechanism, the conventional reduction gear is not required. In addition, the stepping motor can be made compact. Thus, the feed mechanism is effective in eliminating the above-mentioned drawbacks.

However, because the stepping motor generates a small torque, it is necessary to precisely align the motor and the bearing member. For this reason, aligning the stepping motor and the feed shaft is a complicated and time-consuming task to perform. Furthermore, because the bearing member is a separate part, this results in a non-economical increase in the number of parts. In addition, if the alignment precision of the stepping motor and the feed shaft is poor, the load to the stepping motor may increase, thereby causing defective actuation.

SUMMARY OF THE INVENTION

It is therefore an object of the present invention to provide a disk drive apparatus having a bearing portion for a feed shaft formed integrally with a base chassis to rotationally support the feed shaft on the bearing portion, and a head feed mechanism suitable for use in the disk drive apparatus.

In one aspect of the present invention a head feed mechanism comprises a base chassis, an optical pick-up device, and a pick-up feed mechanism. The base chassis rotationally supports a turntable on which an optical disk for recording and/or reproducing information is loaded. The optical pick-up device causes an optical head to face the optical disk loaded on the turntable in order to write and/or read the loaded information. The pick-up feed mechanism has a feed shaft for moving the optical pick-up device toward and away from the turntable, and the feed shaft is supported on a bearing portion provided integrally with the base chassis.

In an additional aspect of the present invention, a disk drive apparatus comprises a disk tray, a base chassis, an optical pick-up device, and a pick-up feed mechanism. The disk tray delivers an optical disk for recording and/or reproducing information to a disk loading position. The base chassis rotationally supports a turntable on which the optical disk is mounted. The optical pick-up device causes an optical head to face the optical disk attached to the turntable in order to write and/or read the information. The pick-up feed mechanism has a feed shaft for moving the optical pick-up device toward and away from the turntable, the feed shaft is supported on a bearing portion being provided integrally with the base chassis.

In a further embodiment of the present invention, a head feed mechanism for a disk drive assembly comprises a spindle chassis, a pickup chassis, a drive unit, and a drive shaft. The pickup chassis is rotationally supported on the spindle chassis, and includes a bearing portion integrally formed in a first portion of the pickup chassis. The drive unit is supported on the pickup chassis proximate a second portion of the pickup chassis, the second portion being positioned opposite the first portion. The drive shaft has first and second ends, the first end being supported by the integrally formed bearing portion and the second end being supported by the drive unit.

In yet a further aspect of the present invention, a spindle chassis for a disk drive assembly head feed mechanism includes first and second side structural members, front and rear structural members, an opening, a bearing portion, first, second and third holes, shaft portions, and a cam piece. The first side structural member and a second side structural member are arranged opposite each other in a first plane. The front structural member and rear structural member are arranged opposite each other in a second plane that is perpendicular to the first plane. The opening is defined by at least the first, second, third and fourth structural members. The bearing portion integrally formed in a first portion of said first side structural member. The first hole is formed in a second portion of the first side structural member, and is positioned opposite the bearing portion. The second and third holes are formed in opposite ends of the second side structural member. The shaft portions extend perpendicularly outward from the first and second side structural members. The cam piece protrudes from the second side structural member and in a direction perpendicular to the front structural member.

BRIEF DESCRIPTION OF THE DRAWINGS

In the following detailed description, reference will be made to the attached drawings in which.

DETAILED DESCRIPTION OF THE PREFERRED EMBODIMENTS

Figure 1:
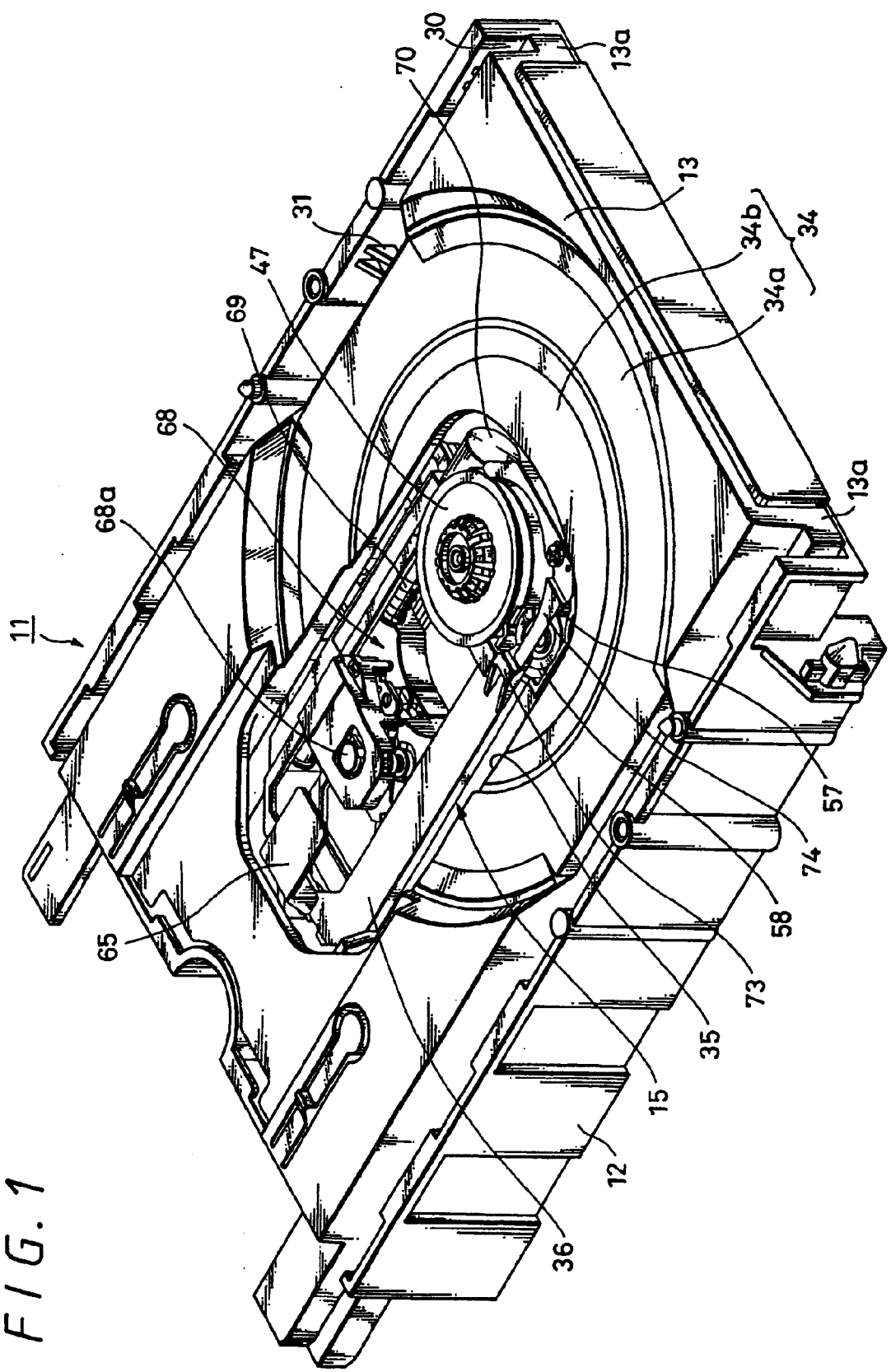
FIG. 1 is a perspective view showing the appearance of a disk drive apparatus according to an embodiment of the present invention.
Figure 2:
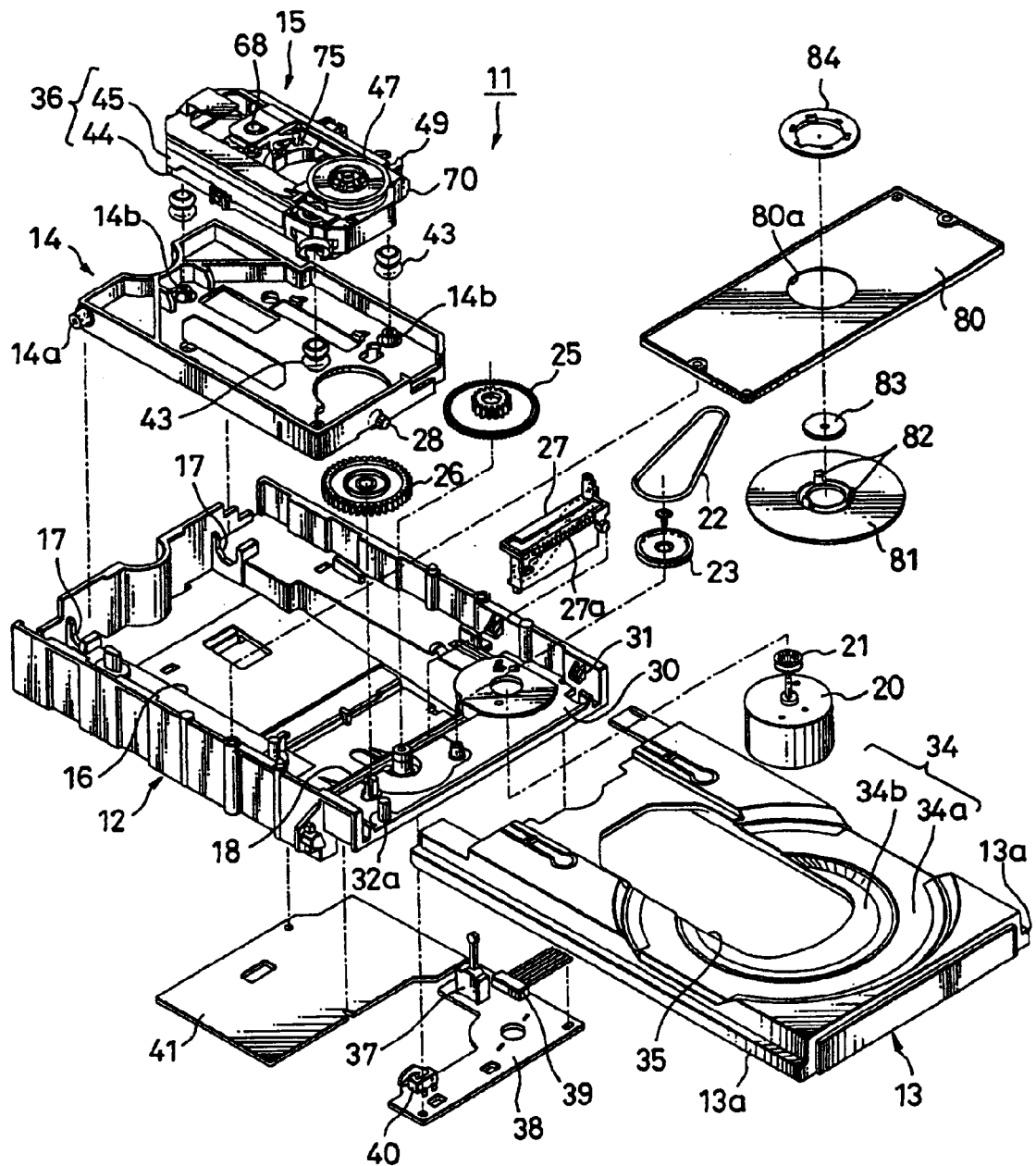
FIG. 2 is an exploded perspective view showing the disk drive apparatus according to the present invention illustrated in FIG. 1.

FIGS. 1 and 2 depict a disk drive apparatus 11 according to an embodiment of the present invention. The disk drive apparatus comprises a main chassis 12, a disk tray 13, a base holder 14, and a base unit 15. The main chassis 12 is box-shaped, and is opened on its top and front faces. The disk tray 13 is moved into and out of the front opening of the main chassis 12. The base holder 14 is housed in the concave portion of the main chassis 12 and is rotationally supported therein. The base unit 15 is elastically supported on the base holder 14.

Figure 3:
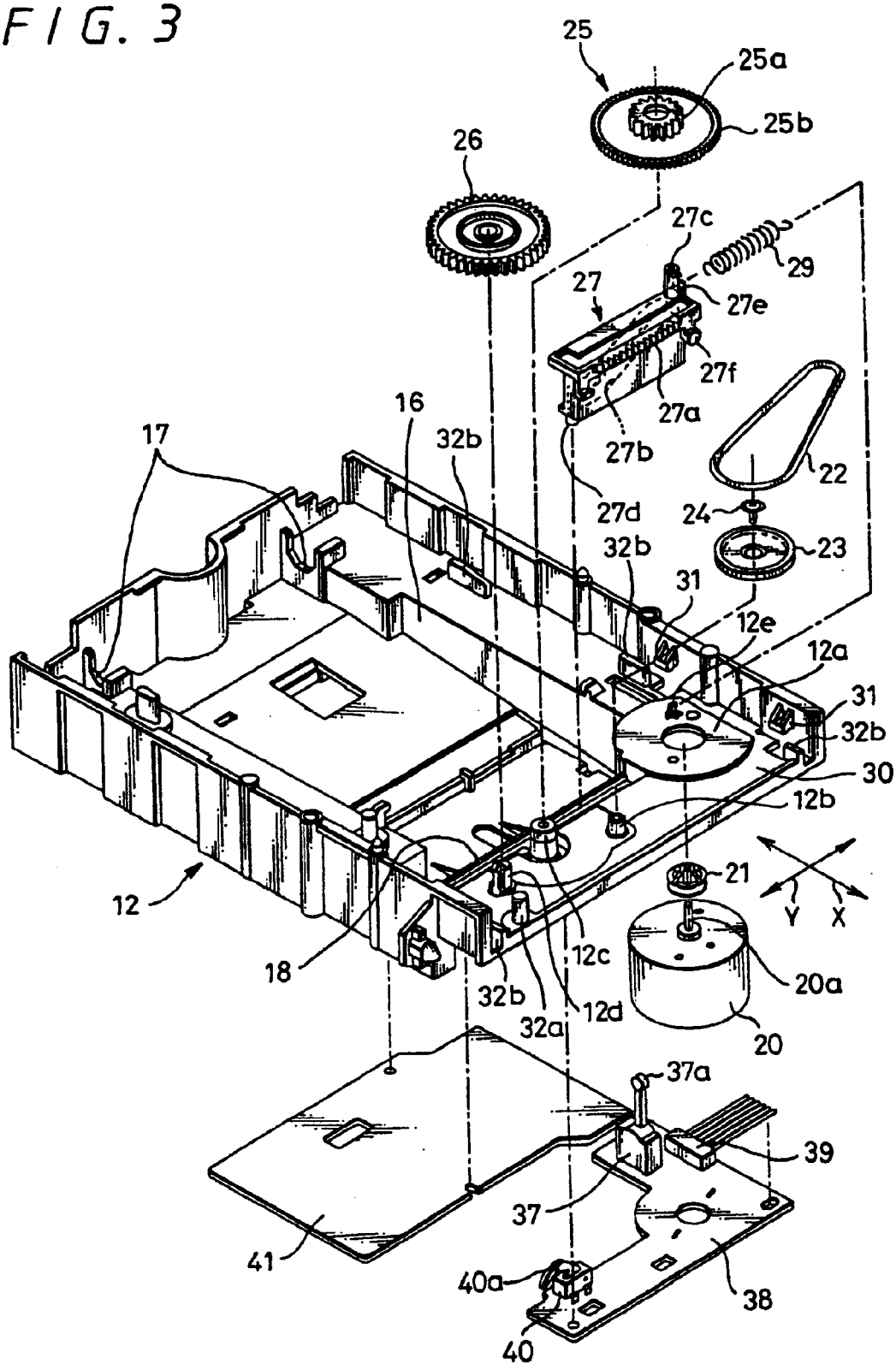
FIG. 3 is a perspective view showing a main part of FIG. 2 in an enlarged scale, illustrating a main chassis and others of the disk drive apparatus according to the present invention.

As is depicted in FIG. 3, the main chassis 12 is formed of a shallow square-like box. The main chassis 12 is provided with a concave portion 16, having an almost square shape, extending to a rear end portion in the central portion of a bottom face. The bottom face of the concave portion 16 is a face that is tilted forward and downward. In the rear end portion, in a front to rear direction X, in which the disk tray 13 is moved in and out, a pair of upwardly opening bearing portions 17, 17 are provided. These bearing portions 17, 17 are provided in both edge portions, in a left to right direction Y, which is perpendicular to the horizontal direction and the front to rear direction X. A pair of shaft portions 14a, 14a provided in the rear end portions on both side faces of the base holder 14 are rotationally pivoted on the bearing portions 17, 17, respectively. A convex guide portion 18 and a slot 19, which are extended in the left to right direction Y in parallel with each other, are provided on the front end of the concave portion 16.

A motor seat portion 12a is formed on the front end of the main chassis 12 bottom face. A loading motor 20 is screwed onto the seat portion 12a on the back side of the main chassis 12. A rotary shaft 20a of the loading motor 20 is protruded into the concave portion 16 through the bottom face of the main chassis 12, and a driving pulley 21 is fixed to the rotary shaft 20a. One end of a rubber belt 22 is stretched around the driving pulley 21, and the other end of the rubber belt 22 is stretched around a driven pulley 23 that is disposed proximate the central portion of the front end of the bottom.

The driven pulley 23 is rotationally supported on a first support shaft 12b erected on the front end of the bottom face of the main chassis 12, and is fastened via a setscrew 24 screwed to the first support shaft 12b. A gear (not shown) is formed integrally with the lower face of the driven pulley 23 and is engaged with a middle gear 25b of an intermediate gear 25. The intermediate gear 25 is rotationally supported on a second support shaft 12c, that is erected on the front end of the bottom face. A driving gear 26, rotationally supported on a third support shaft 12d that is erected on the front end of the bottom face, is engaged with an upper gear 25a, provided on the upper face of the middle gear 25b of the intermediate gear 25.

Figure 10:
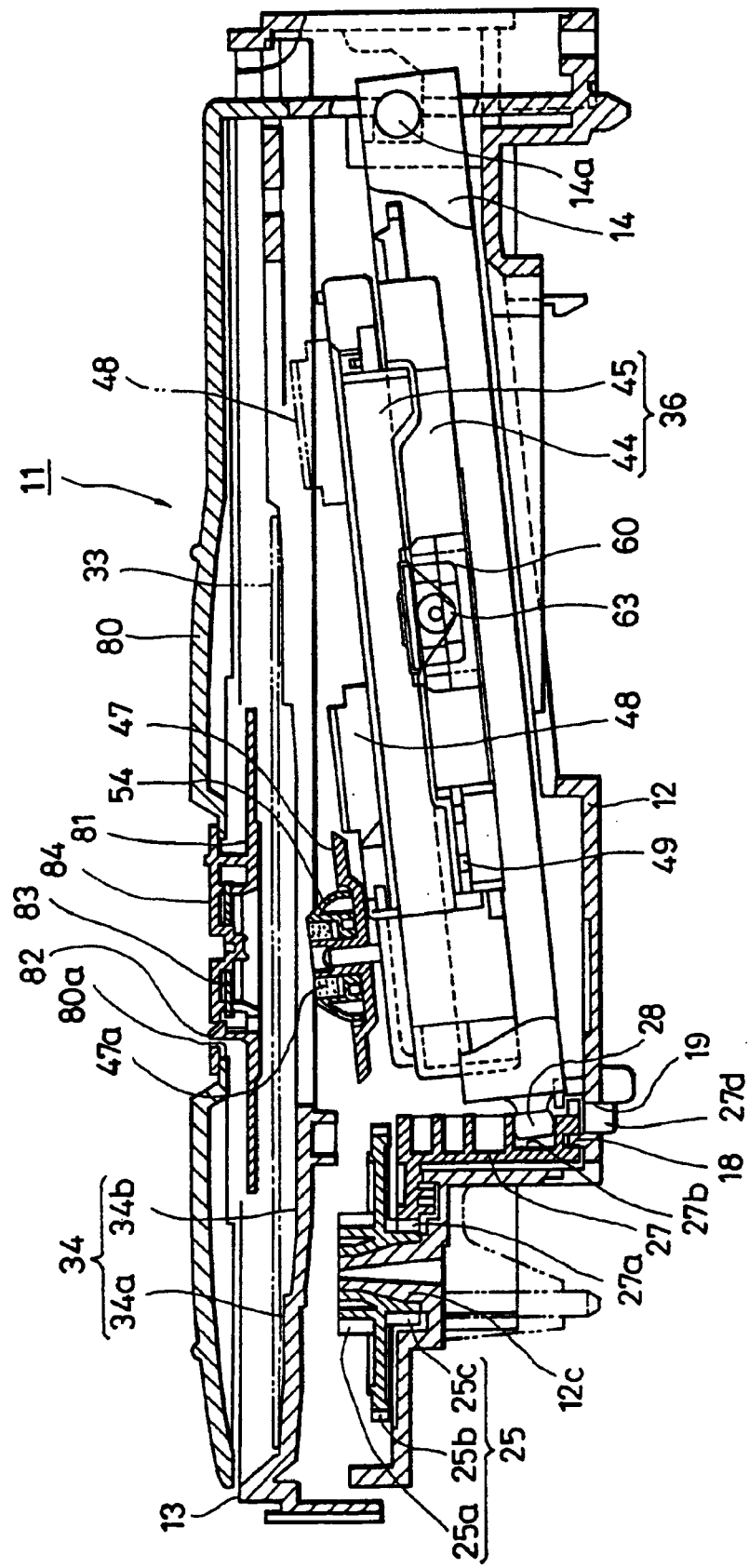
FIG. 10 is a sectional view showing the disk drive apparatus according to the present invention which is cross-sectioned in the tray delivery direction, illustrating an unloading state in which the turntable is lowered.

A lower gear 25c is formed integrally with the lower face of the middle gear 25b of the intermediate gear 25. A rack 27a of a chuck cam 27 is engaged with the lower gear 25c, as shown in FIG. 10. The chuck cam 27 is formed of a block-shaped member which is an oblong rectangle, and a rack 27a projected to one face side is formed on the upper portion of the chuck cam 27. A guide groove extended in the front to rear direction is provided on the lower face of the chuck cam 27. Furthermore, a cam groove 27b for swinging the base holder 14 in the up and down direction is provided on a face opposite to the rack 27a of the chuck cam 27.

The cam groove 27b of the chuck cam 27 has upper and lower horizontal portions provided on both ends in the front to rear direction and a slant face portion for causing the upper and lower horizontal portions to obliquely communicate with each other. A cam pin 28, which projects forward into the front end face of the base holder 14, is slidably engaged with the cam groove 27b. Furthermore, operation pins 27c and 27d, for manually sliding the chuck cam 27, are provided on the upper and lower faces of the chuck cam 27. The lower operation pin 27d is protruded into the back side through the slot 19 of the main chassis 12, as shown in FIG. 10.

A spring receiving piece 27e is provided on the base of the upper operation pin 27c of the chuck cam 27. One end of a helical tension spring 29 is engaged with the spring receiving piece 27e. The other end of the helical tension spring 29 is engaged with the spring receiving piece 12e provided in the seat portion 12a of the main chassis 12. The chuck cam 27 is biased toward the seat portion 12a side by the spring force of the helical tension spring 29. Accordingly, when the chuck cam 27 is positioned at an end on the seat portion 12a side, the cam pin 28 is positioned in the lower horizontal portion of the cam groove 27b and the base holder 14 is kept forward and downward. Conversely, when the chuck cam 27 is positioned at an end on the side apart from the seat portion 12a, the cam pin 28 is positioned in the upper horizontal portion of the cam groove 27b and the holder 14 is kept in an almost horizontal state.

The opening on the front face of the main chassis 12 is a tray entrance 30. A plurality of tray guides 31 are provided on internal faces of the side pieces, enclosing both side portions of the tray entrance 30, and a plurality of guide pins 32a and 32b are provided on a bottom piece. A pair of guide rails 13a, 13a are provided on the right and left side portions of the disk tray. These guide rails 13a, 13a are regulated by the tray guides 31 and the guide pins 32a and 32b so that the disk tray 13 is held movably in the front to rear direction X with respect to the main chassis 12. Thus, the disk tray can be moved in and out through the tray entrance 30.

Figure 4:
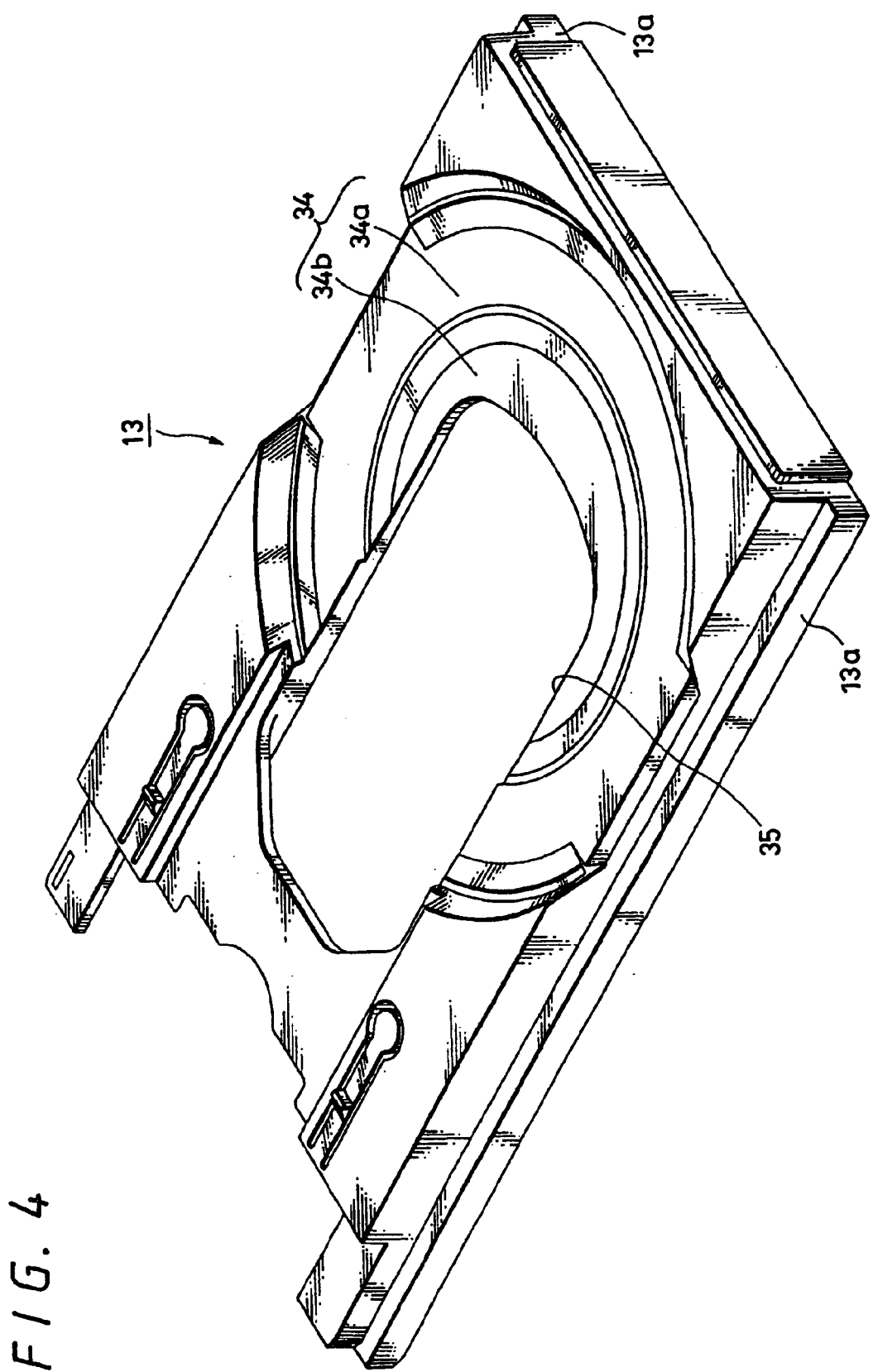
FIG. 4 is a perspective view showing a disk tray of the disk drive apparatus according to the present invention.

As shown in FIG. 4, the disk tray 13 is provided with a disk housing portion 34 formed of a circular concave portion. The disk housing portion 34 is capable of housing, in a transverse direction, an optical disk 33. A slot-shaped opening 35 is also provided and extends rearward from the central portion of the disk housing portion 34 along a tray center. The disk housing portion 34 has a large diameter portion 34a, on which a 12 cm diameter disk can be mounted, and a small diameter portion 34b, on which an 8 cm diameter disk can be mounted.

An opening 35 of the disk tray 13 is positioned ahead of the central portion of the small diameter portion 34b of the disk housing portion 34, and extends beyond the outside circumference of the disk housing portion 34, with a part of the large diameter portion 34a cut away. The opening 35 has such a size and shape that it can receive the entire upper part of the base unit 15.

A pair of right and left guide rails 13a, 13a, extended in parallel with each other in the front to rear direction, are provided on right and left side edges of the disk tray 13. A rack and a guide groove (not shown) extend in parallel with the guide rail 13a, and are provided integrally on one side of the lower face of the disk tray 13. The driving gear 26, supported on the main chassis 12, is engaged with the rack, and the disk tray 13 is moved forward or backward by the rotary force of the driving gear 26. The rack has a length such that when the disk tray 13 is moved to a position immediately before the endmost portion, its engagement with the driving gear 26 is released. Moreover, the guide pin 32a, erected in the front portion of the main chassis 12, is slidably engaged with the guide groove. The movement of the disk tray 13 is also regulated by the guide pin 32a and is moved rectilinearly in the front to rear direction X.

The forward and backward movement of the disk tray 13 is detected by a tray feed detecting switch 37. By the operation of the tray feed detecting switch 37, it is possible to detect whether the disk tray 13 is moved in the eject direction, in which the optical disk 33 is discharged, or in the set direction, in which the optical disk 33 is delivered to a disk loading portion. The tray feed detecting switch 37 is fixed to a printed wiring board 38 attached to the lower face of the main chassis 12. An actuating member 37a of the tray feed detecting switch 37 is protruded onto the moving locus of the disk tray 13 through a through hole provided in the main chassis 12.

A connecting terminal 39 for supplying power to the loading motor 20 and other components is mounted on the printed wiring board 38. A cam detecting switch 40 for detecting the operation of the chuck cam 27 is also mounted on the printed wiring board.

An actuating member 40a of the cam detecting switch 40 is provided on the moving locus of an input portion 27f provided on the chuck cam 27. When the chuck cam 27 is moved away from the seat portion 12a by a predetermined amount, the cam detecting switch 40 is closed. Reference numeral 41, shown in FIG. 3, denotes a cover plate to be fixed to the lower face of the main chassis 12.

Figure 5:
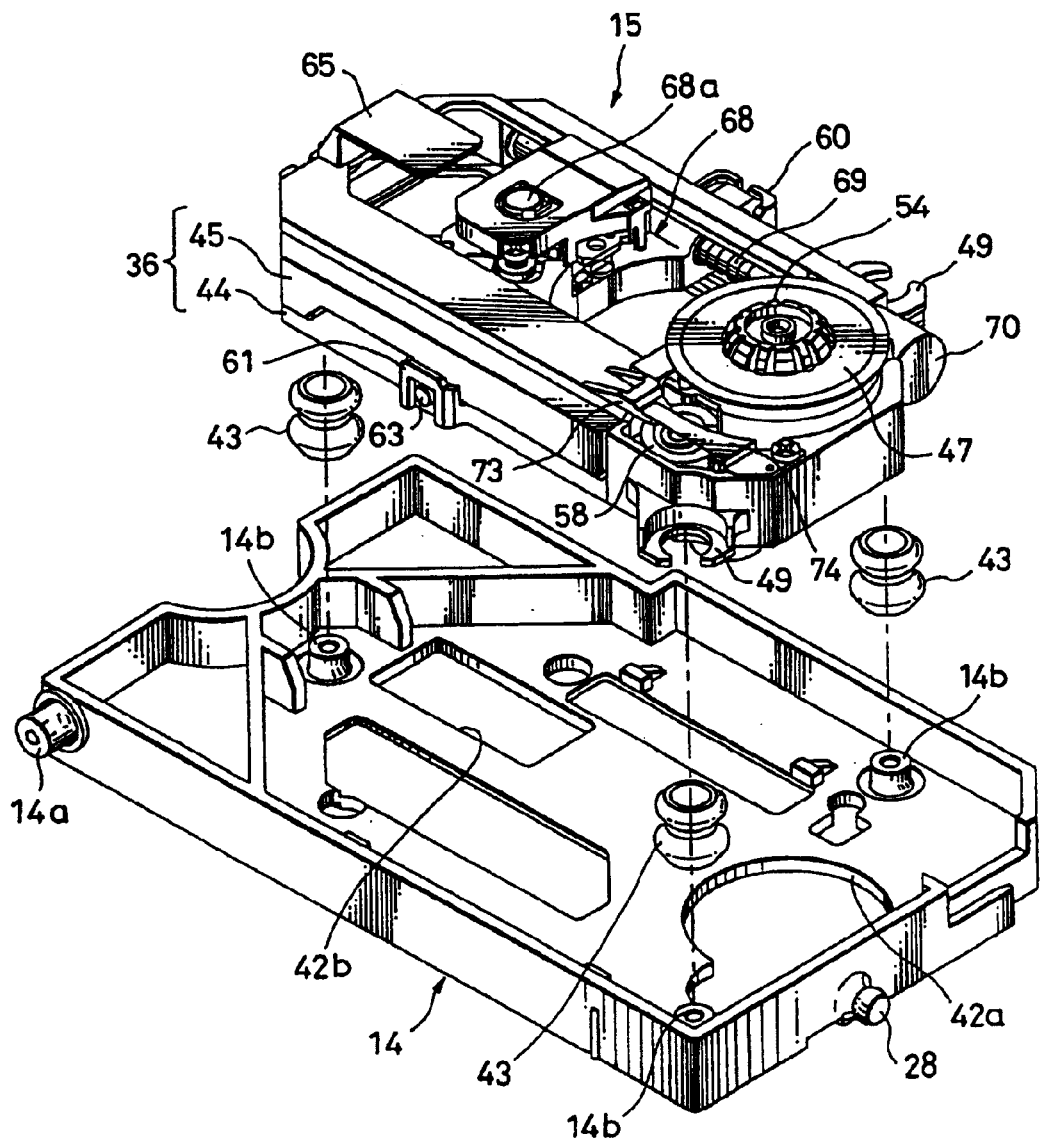
FIG. 5 is a perspective view showing the main part of FIG. 2 in an enlarged scale, illustrating a base chassis and a base holder of the disk drive apparatus according to the present invention.
Figure 6:
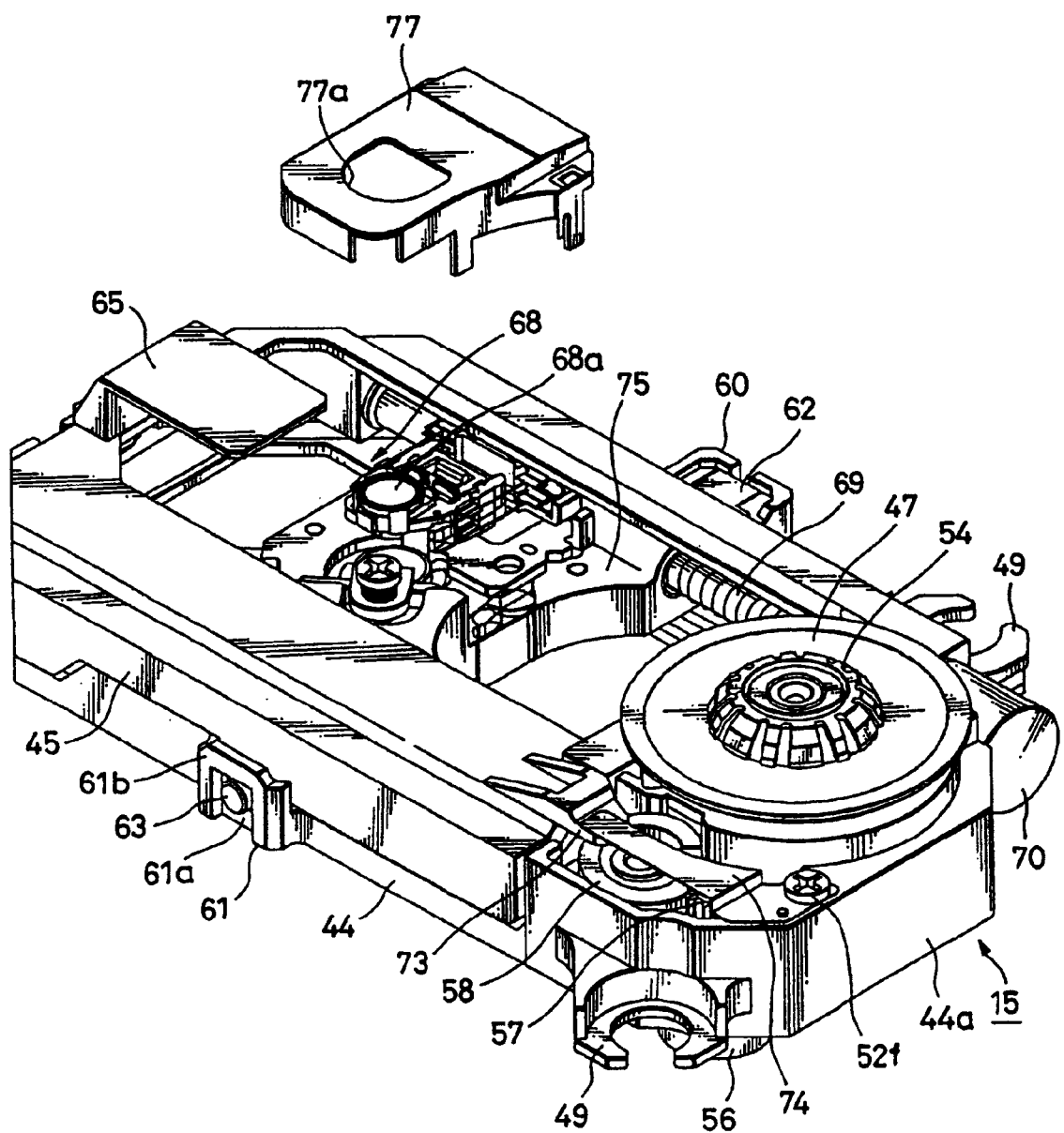
FIG. 6 is a perspective view showing a base unit of the disk drive apparatus according to the present invention, illustrating a state in which a biaxial cover is exploded.
Figure 7:
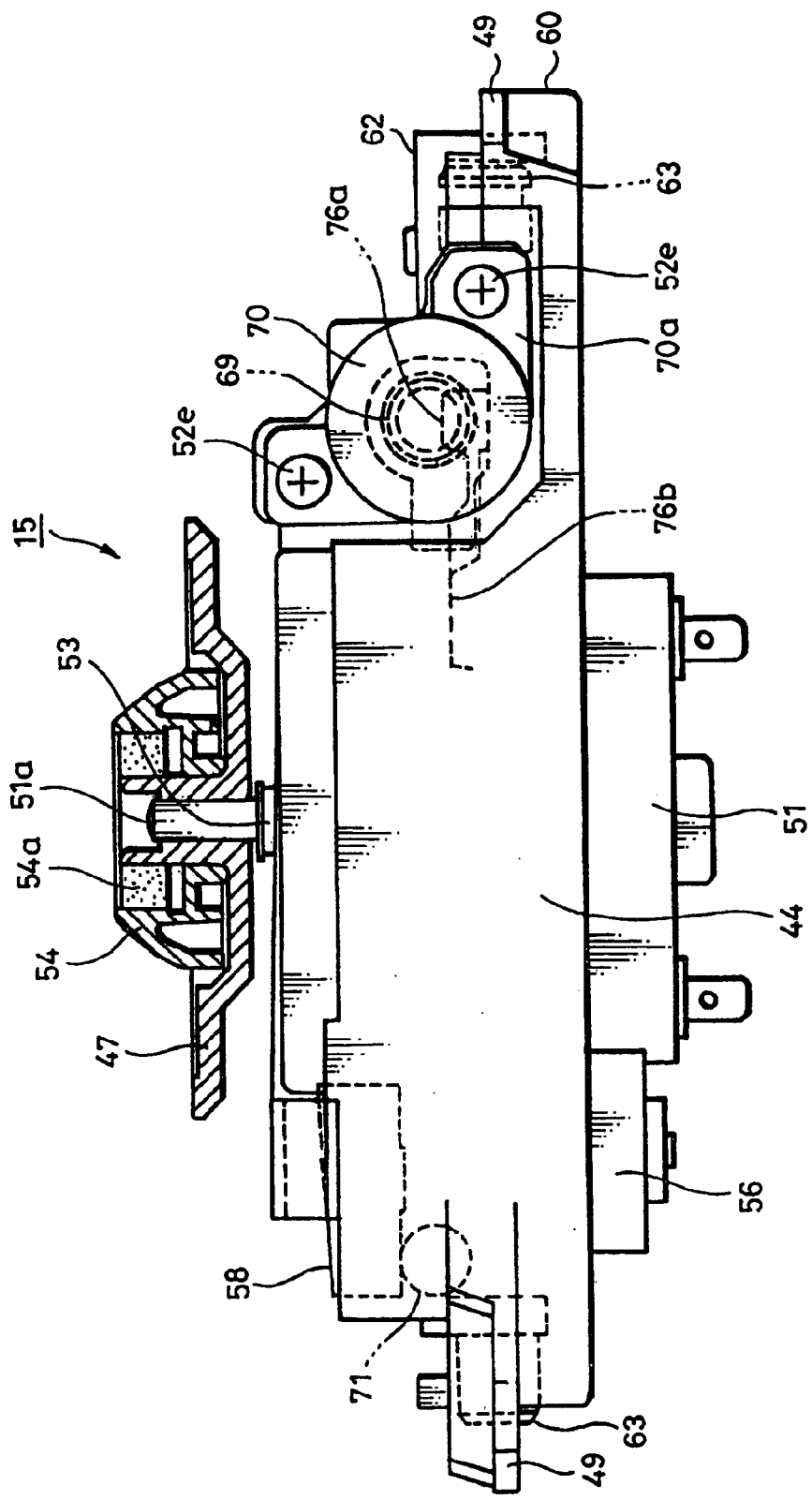
FIG. 7 is a front view showing the base unit of the disk drive apparatus according to the present invention, illustrating a state in which a turntable is cross-sectioned.

The base holder 14, housed in the concave portion 16 of the main chassis 12, has the shape shown in FIG. 5. More specifically, the base holder 14 is in the form of a box, which is shallow and somewhat rectangular. The base holder 14 includes the above-mentioned cam pin 28 on a front plate thereof, and also includes a pair of shaft portions 14a provided on the rear end of each of the right and left side plates. Through the bottom plate of the base holder 14 an opening 42a is provided for preventing contact with the spindle motor, and an opening 42b for causing a flexible printed wiring board or the like to pass. A convex portion 14b for positioning and elastically supporting the base unit 15 is provided at three portions on the upper face of the bottom plate. An elastic insulator 43 is attached to the convex portion 14b.

The base unit 15 has a structure shown in. FIGS. 5 to 8. More specifically, the base unit 15 comprises a spindle chassis 44 and a pick-up chassis 45. The spindle chassis 44 rotationally supports a turntable 47, on which the optical disk 33 to be used for reproducing an information signal is loaded. The pick-up chassis 45 movably supports an optical pick-up device 48 for reading the information signal from the optical disk 33 loaded on the turntable 47. The spindle chassis 44 and the pick-up chassis 45 constitute a base chassis 36.

Figure 8:
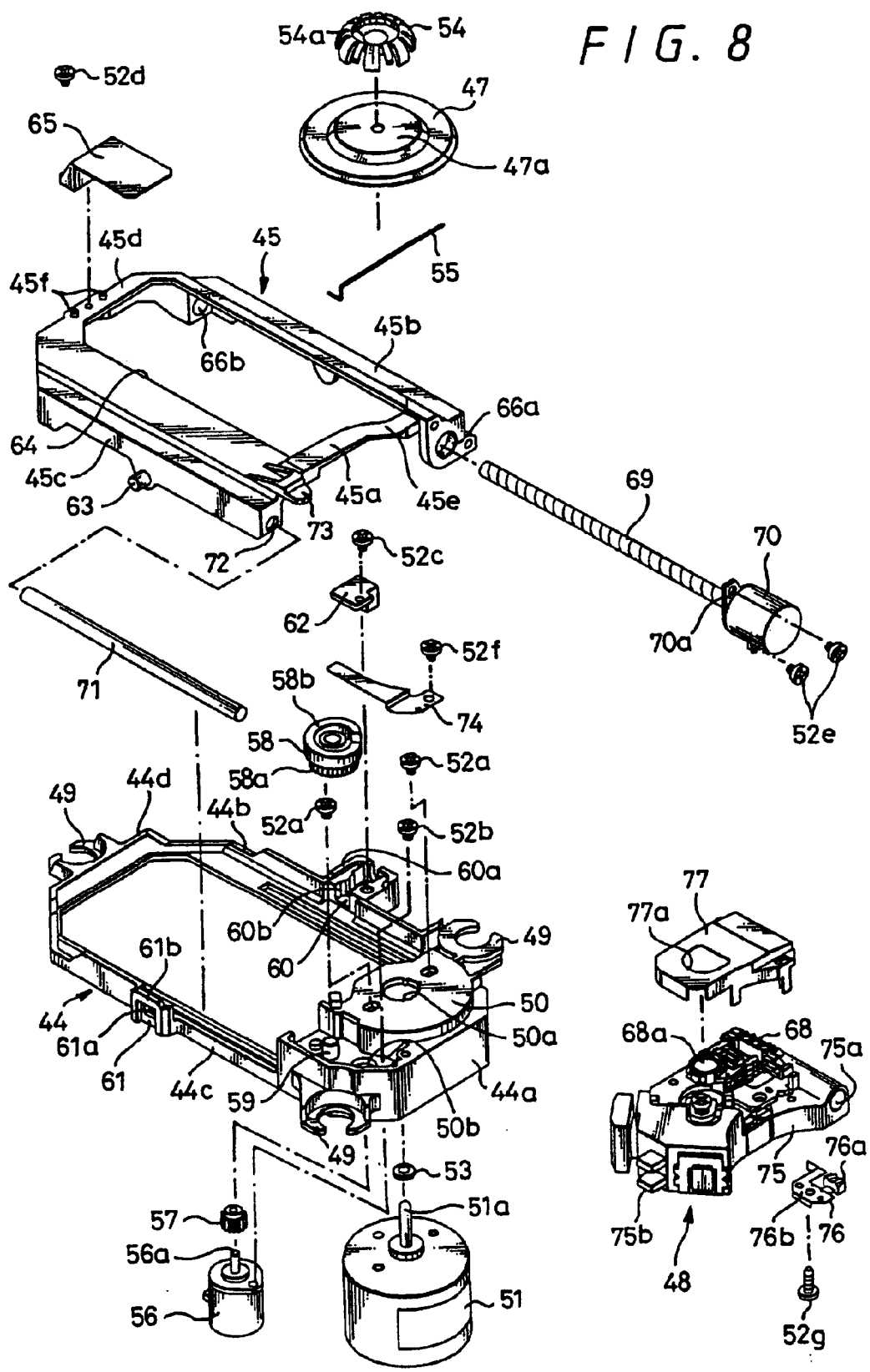
FIG. 8 is an exploded perspective view showing the base unit of the disk drive apparatus according to the present invention.

The spindle chassis 44 of the base unit 15 is formed of a frame-shaped member having a front face piece 44a, right and left side face pieces 44b and 44c, and a rear face piece 44d, as shown in FIG. 8. The front face piece 44a has a height which is almost twice the height of each of the other pieces. Supporting portions 49, for supporting an insulator 43, are provided at three portions of the spindle chassis 44: one at a corner portion of the front face piece 44a, one at the front end of the side face piece 44b, and another proximate the central portion of the rear face piece 44d. Each supporting portion 49 has a C-shaped cross section and takes the shape of a click. The constricted portion of the insulator 43 is inserted in the supporting portion 49. A fixing screw (not shown) is inserted in the insulator 43 from above, and a screw portion on the tip end is screwed into a screw hole provided on the upper face of the convex portion 14b. Consequently, the base unit 15 is elastically supported on the base holder 14 through the three insulators 43.

The front face piece 44a of the spindle chassis 44 is provided with a motor fixing seat 50. A spindle motor 51 is attached to the inside of the motor fixing seat 50, and is integrally fastened with a plurality of screws 52a. A rotary shaft 51a of the spindle motor 51 penetrates through a hole 50a of the motor fixing seat 50 and is projected upward from the spindle chassis 44.

An offset washer 53 is fitted onto the rotary shaft 51a of the spindle motor 51, and the turntable 47 is fitted and fixed above the offset washer 53. A ring fixing portion 47a is projected in the central portion of the upper face of the turntable 47, and a chucking ring 54 is fitted onto the ring fixing portion 47a. A magnet 54a is buried in the chucking ring 54 concentrically with the central hole. The central hole of the optical disk 33 is fitted on the chucking ring 54 so that the optical disk 33 is positioned on the turntable 47.

Reference numeral 55, shown in FIG. 8, denotes an offset spring for regulating the movement of the rotary shaft 51a in the axial direction. The offset spring 55 is set to traverse the motor fixing seat 50, and has a midway portion engaged with the offset washer 53 and both ends engaged with the motor fixing seat 50.

A tilt motor 56 is attached to the inside of the motor fixing seat 50 proximate the spindle motor 51. The tilt motor 56 is integrally fastened with one screw 52b. A rotary shaft 56a of the tilt motor 56 penetrates a hole 50b of the motor fixing seat 50 and projects upward from the spindle chassis 44. A tilt gear 57 is fitted to the rotary shaft 56a of the tilt motor 56, and a gear portion 58a of a tilt cam 58 is engaged with the tilt gear 57. The tilt cam 58 is rotationally supported on a supporting shaft 59 erected on the upper face of the front face piece 44a. The upper face of the tilt cam 58 is provided with a spirally extending cam face 58b. The pick-up chassis 45 is thereby rotated by a stroke of the cam face 58b.

The side face pieces 44b and 44c, and the rear face piece 44d, of the spindle chassis 44 are formed having an L-shaped cross section over almost the whole length in the front to rear direction. This cross sectional shape enhances the rigidity of the entire spindle chassis 44. Furthermore, a pair of bearing portions 60 and 61 are provided near the central portion of each side face piece 44b and 44c in the front to rear direction so as to be projected in the transverse direction. A pair of rotary shaft portions 63, provided in the pick-up chassis 45, are rotationally held in the bearing portions 60 and 61.

Bearing portion 60 includes a box-shaped box edge 60a, which projects outwardly and is opened on the upper face, and a V-shaped receiving face 60b, provided in the box edge 60a. One rotary shaft portion 63 is mounted on the receiving face 60b. By pressing the rotary shaft portion 63 with a press piece 62 from above, the rotary shaft portion 63 is securely fitted. The press piece 62 is fastened to the box edge 60a with a fixing screw 52c. The other bearing portion 61 includes a V-shaped receiving face 61a and an arch-type press piece 61b for enclosing the receiving face 61a. The press piece 61b is formed integrally with the side face piece 44c, and the other rotary shaft portion 63 is inserted from the inside, thereby rotationally holding the other rotary shaft portion 63 together with the receiving face 61a.

The pick-up chassis 45 has almost the same size and shape as the spindle chassis 44, absent the front face piece 44a. More specifically, the pick-up chassis 45 is located behind the front face piece 44a of the spindle chassis 44, and is formed of a frame-shaped member having a front face piece 45a adjacent to the front face piece 44a, a pair of side face pieces 45b and 45c opposed to each other on the right and left, and a rear face piece 45d connected rearward. An opening 64, through which an optical head 68 of the optical pick-up device 48 passes, is provided on the inside of the frame-shaped member.

Furthermore, the side face pieces 45b and 45c and the rear face piece 45d have an L-shaped cross section over most of the length. This cross sectional shape enhances the rigidity of the whole pick-up chassis 45. Moreover, the pair of rotary shaft portions 63, described above, are projected near the central portion of each of the side face pieces 45b and 45c in the front to rear direction. The heights of the side face pieces 45b and 45c and the rear face piece 45d are nearly equal to the height of the side face piece 44b of the spindle chassis 44. Accordingly, the pick-up chassis 45 overlaps the spindle chassis 44 at a predetermined position, thereby making the height of the overlapping portion almost equal to that of the spindle chassis front face piece 44a portion.

The front face piece 45a of the pick-up chassis 45 has the form of a plate, such that the right and left side face pieces 45b and 45c are coupled thereto on only their upper faces. The upper face of the front face piece 45a is provided with a slant face portion 45e. The slant face portion 45e is connected to the side face piece 45b. Thus, the side face piece 45b is lower, or tilted, in the extension direction, that is, the transverse direction. The front face piece 45a constitutes the edge portion of the pick-up chassis 45 which enters into the underside of the turntable 47. Thus, the slant face portion 45e is provided on the front face piece 45a of the pick-up chassis 45. Consequently, the number of parts can be reduced as compared with a conventional base chassis, and results in easier assembly.

A positioning projection 45f is provided on the upper face of the pick-up chassis rear face piece 45d. A light shielding plate 65 is fastened onto the rear face piece 45d with a screw 52d by means of the positioning projection 45f. The light shielding plate 65 has a nearly L-shaped cross section, and covers the upper portion of the optical head 68 of the optical pick-up device 48 when moved to the outermost position, in particular, an objective lens 68a.

An inserting hole 66a is provided through the front edge of the pick-up chassis side face piece 45b, and a bearing portion 66b is provided in the rear end portion thereof. A bearing member provided on a feed motor 70 is fitted in the front inserting hole 66a, and the tip end of a feed shaft 69 inserted into the inserting hole 66a is rotationally supported on the bearing portion 66b. The feed shaft 69 is the rotary shaft of the feed motor 70 and has a spiral thread groove formed on its outer peripheral face. The feed shaft 69 itself constitutes a rotor of the feed motor 70. The feed motor 70 is fixed to the front edge of the side face piece 45b and is projected forward from the pick-up chassis 45 by fastening a bracket 70a on the fixing side with two fixing screws 52e.

A guide shaft 71 is fixed to the inside of the pick-up chassis side face piece 45c opposite to, and in parallel with, the feed shaft 69. To this end, a pair of inserting holes 72 are provided on the front and rear edges of the side face piece 45c. Both ends of guide shaft 71 are press fitted into the inserting holes 72, thereby supporting both ends of the guide shaft.

A cam piece 73 is projected onto the tilt cam face 58b. Cam piece 73 is provided on the front edge of the upper portion of the side face piece 45c of the pick-up chassis 45. The free end of a leaf spring 74 comes in contact with the cam piece 73, and biases the cam piece 73, by the spring force of the leaf spring 74, to contact the tilt cam face 58b. The fixed end of the leaf spring 74 is fastened to the upper face of the front face piece 44a of the spindle chassis 44 with a screw 52f.

The optical pick-up device 48, movably supported by the feed shaft 69 and the guide shaft 71, is guided by both shafts 69 and 71 to both approach, and move away from, the turntable 47. The optical pick-up device 48 has a slide member 75 on which the optical head 68 is mounted. A bearing hole 75a is provided on one side of the slide member 75, and the feed shaft 69 is slidably inserted into the bearing hole 75a. A rack portion 76a of a sliding rack 76, fixed to the lower face of the slide member 75, is engaged with the thread groove of the feed shaft 69. The rack portion 76a is formed integrally with a fixed piece 76b through an elastic piece. The fixed piece 76b is fastened with a fixing screw 52g, thereby fixing the sliding rack 76 to the slide member 75. Furthermore, a bearing portion 75b is provided on the other side of the slide member 75, and the guide shaft 71 is slidably inserted into the bearing portion 75b.

A head feed mechanism for moving the optical pick-up device 48 includes the above-mentioned feed shaft 69, the feed motor 71 and the sliding rack 76. A reduction mechanism includes the feed shaft 69 and the sliding rack 76.

The optical head 68 of the optical pick-up device 48 has a biaxial actuator capable of independently moving the objective lens 68a in the focus direction (up and down direction) and the tracking direction (transverse direction). Electromagnetic force is exclusively used as the driving force of the biaxial actuator. The present embodiment employs a leaf spring-type biaxial actuator, which is classified by the difference of a support type of a movable portion. As a matter of course, however, other types of biaxial actuators, such as a wire support type, a hinge type and a shaft sliding type can be used. Reference numeral 77, shown in FIG. 8, denotes a biaxial cover for covering the biaxial actuator. An opening window 77a for exposing the objective lens 68a is provided through the biaxial cover 77.

Figure 9:
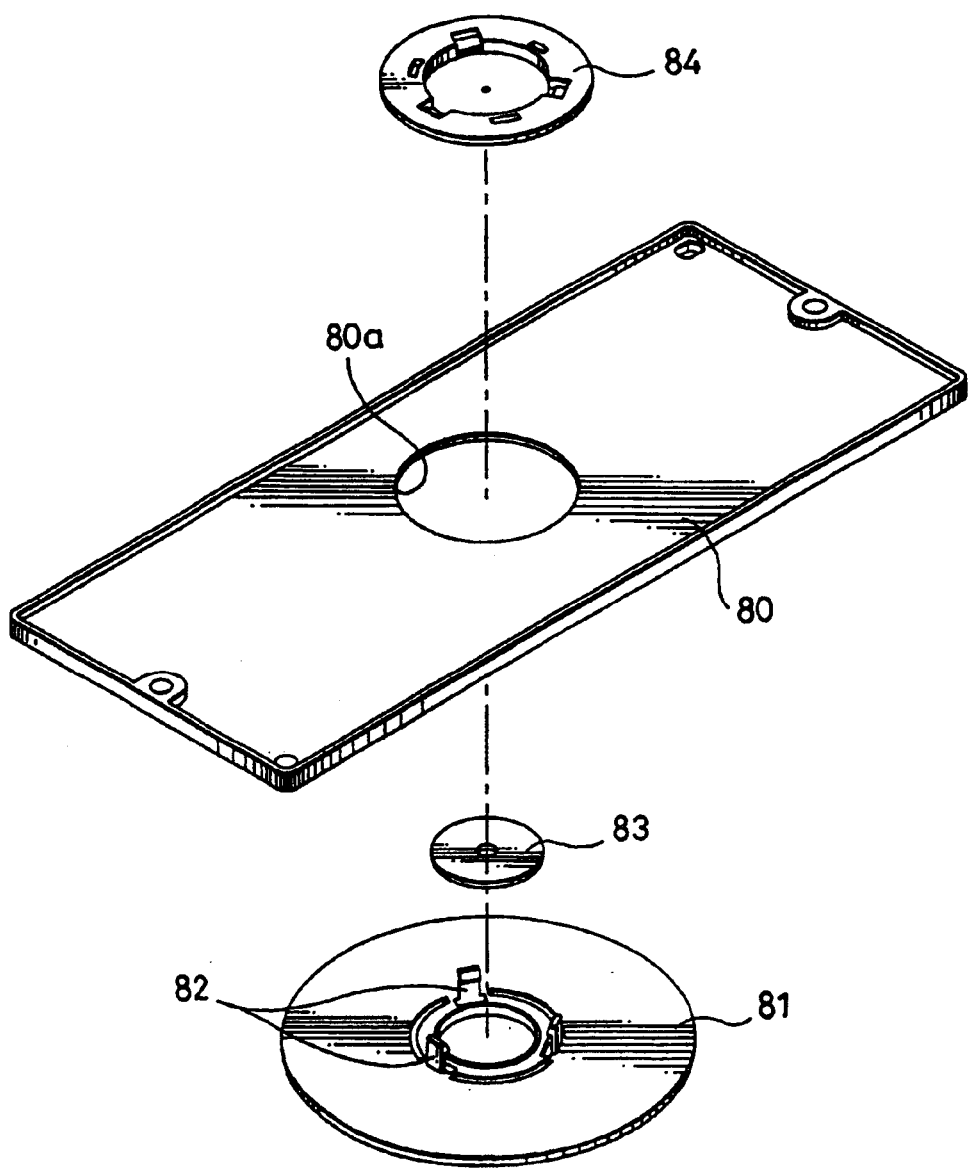
FIG. 9 is a perspective view showing the main part of FIG. 2 in an enlarged scale, illustrating a chuck plate and the like of the disk drive apparatus according to the present invention.

As shown in FIG. 2, a chuck holder 80 is fixed above the main chassis 12 to traverse the upper portion of the disk tray 13. The chuck holder 80 is formed of a square plate which is thin and oblong, as is shown in FIG. 9. A through hole 80a is provided near the central portion of the chuck holder 80, in the front to rear direction. Three leg pieces 82 of a chuck plate 81 are loosely inserted into the through hole 80a. The three leg pieces 82 are arcuately positioned such that the outer peripheral faces thereof form a part of a circumference. A disc-shaped yoke plate 83, made of an iron plate or the like, which is adsorbed by a magnet 54a built in the chucking ring 54, is housed in each of the leg pieces 82.

A yoke press plate 84 is fixed to the tip end portion of each leg piece 82, which protrude upwardly from the through hole 80a of the chuck holder 80. The yoke press plate 84 and the chuck plate 81 interpose the chuck holder 80 therebetween while holding a predetermined clearance so that the chuck plate 81 can be moved in a direction orthogonal to the plane direction within the range of the clearance. By setting a clearance between the through hole 80a and the three leg pieces 82, the chuck plate 81 can be moved in the plane direction within the range of the clearance.

Although an ABS resin is suitable for the material of each of the main chassis 12, the disk tray 13 and the base holder 14, it is clear that other synthetic resins can be used, or that a metal, such as an aluminum alloy or the like, can also be used. Also, while PPS (polyphenylene sulfide) containing 65% glass fiber is a suitable material for the spindle chassis 44 and the pick-up chassis 45 it is clear that other synthetic resins can be used, and a metal, such as an aluminum alloy or the like, can also be used.

Figure 11:
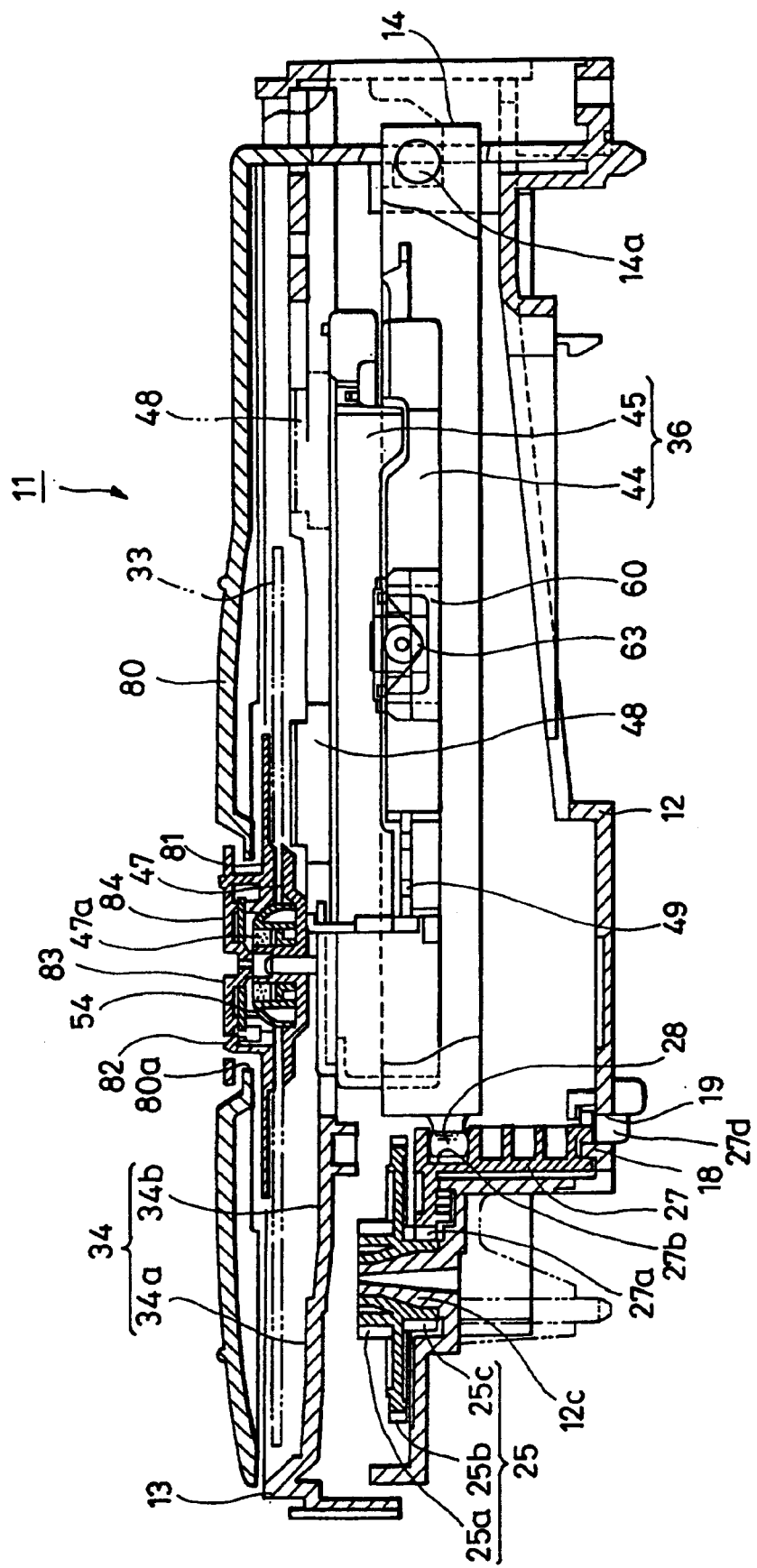
FIG. 11 is a sectional view showing the disk drive apparatus according to the present invention which is cross-sectioned in the tray delivery direction, illustrating a loading state in which the turntable is lifted.

A disk drive apparatus 11 having the above-described structure, can perform the reproducing operation of the optical disk 33 in the following manner. First, after the disk drive apparatus 11 is turned on, an eject button, for example, is pushed to eject the disk tray 13. Consequently, the disk housing portion 34 is exposed and the optical disk 33 can be inserted into either the large diameter portion 34a or the small diameter portion 34b. After a desired sized optical disk 33 is mounted on the disk housing portion 34, for example, a reproducing button is pushed to operate a loading mechanism. Consequently, the disk tray 13 is delivered to the disk loading portion. This state is shown in FIG. 10. By the way, the chuck holder 80, shown in FIGS. 10 and 11, is obtained by slightly modifying the chuck holder 80 shown in FIG. 9 and has such a shape that the disk housing portion 34 and the opening 35 can be wholly blocked simultaneously.

When the loading motor 20 is driven by the operation of the reproducing button or the like during the delivery of the disk tray 13, the rotary force thereof is transmitted from the driving pulley 21 to the driven pulley 23 via the rubber belt 22. The rotary force of the driven pulley 23 is transmitted from the middle gear 25b of the intermediate gear 25 to the driving gear 26 through the upper gear 25a. The rotary force of the driving gear 26 is transmitted to the rack of the disk tray 13. Consequently, the disk tray 13 is guided by the tray guide 31 and the guide pins 32a and 32b and is moved rearward of the main chassis 12. At this time, while the disk tray 13 is moved to the rearmost end, the lower gear 25c of the middle gear 25 is not engaged with the rack 27a of the chuck cam 27. Therefore, the chuck cam 27 is not moved.

Thereafter, when the disk tray 13 is moved to the rearmost end, the upper operating pin 27c of the chuck cam 27 enters into the cam groove provided on the lower face of the disk tray 13, and the chuck cam 27 is guided by the cam groove and is slightly moved. As a result, the rack 27a of the chuck cam 27 is engaged with the lower gear 25c so that a torque can be transmitted from the loading motor 20. When the disk tray 13 reaches the rearmost end, the engagement of the rack of the disk tray 13 with the driving gear 26 is released, thus the torque is no longer transmitted from the loading motor 20.

Next, when the rotary force of the loading motor 20 is transmitted from the lower gear 25c to the rack 27a, the chuck cam 27 is moved away from the loading motor 20 against the spring force of the helical tension spring 29. By the movement of the chuck cam 27, the cam pin 28 of the base holder 14, which is engaged with the cam groove 27b, is moved from the lower horizontal portion of the cam groove 27b to the upper horizontal portion thereof through the slant face portion. As a result, the base holder 14 is swung upward through the shaft portion 14a on the rear end portion and is brought into the almost horizontal state. This state is shown in FIG. 11.

At this time, when the front portion of the base holder 14 is lifted, the turntable 47 supported on the swinging side of the base unit 15, which is elastically supported on the base holder 14 through the insulator 43, enters into the opening 35 of the disk tray 13. Consequently, the chucking ring 54, attached to the turntable 47, enters into the central hole 33a of the optical disk 33, thus mounting the optical disk 33 on the turntable 47. In this case, the optical disk 33 is slightly lifted by the turntable 47 and the chuck plate 81, held in the chuck holder 80, is adsorbed to the magnet 54a built in the chucking ring 54.

As a result, the optical disk 33 is gripped between the turntable 47 and the chuck plate 81. Consequently, the optical disk 33 is integral with the turntable 47 in the direction of rotation, and is rotated by the rotary force of the spindle motor 51 at a predetermined rotational speed.

At the same time, or before or after, the feed motor 70 is driven. As a result, the rotation of the feed shaft 69 causes the slide member 75 of the optical pick-up device 48 to be moved toward the turntable. By the movement of the optical pick-up device 48 toward the turntable 47, the tilt of the optical disk 33 attached to the turntable 47 can be detected. The amount of the tilt of the optical disk 33 can be detected in the following manner, for example.

More specifically, when the optical pick-up device 48 is moved from the outside toward the inside in the radial direction of the optical disk 33, a laser beam is irradiated from the objective lens 68a of the optical head 68 onto the information recording face of the optical disk 33. The time it takes the laser beam to return is continuously detected. By comparing the times thus detected with each other, the amount of the tilt of the optical disk 33 can be detected.

Figure 12:
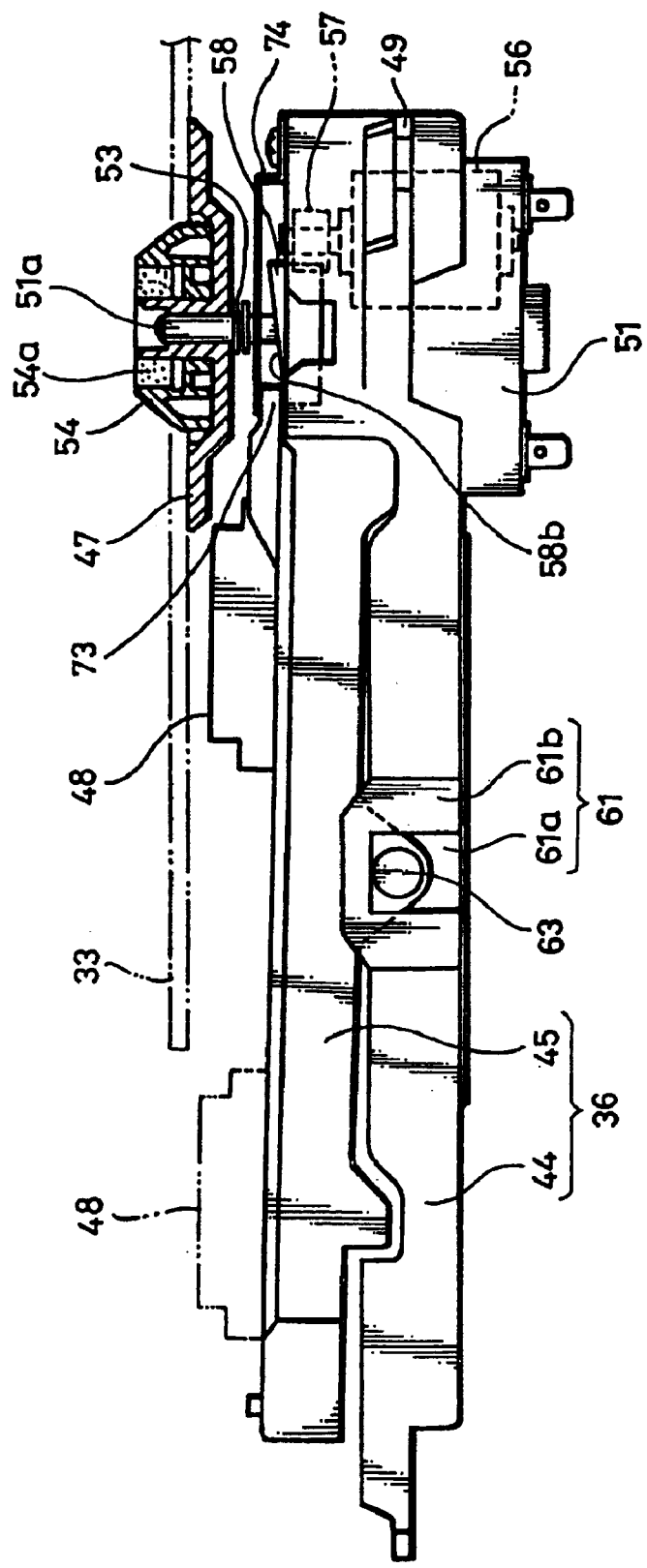
FIG. 12 is a side view showing a base chassis of the disk drive apparatus according to the present invention, illustrating a state in which a pick-up chassis is tilted forward.

Next, the operation for correcting the amount of tilt of the optical disk 33 thus detected will be described. It is assumed that the spindle chassis 44 and the pick-up chassis 45 are tilted toward the turntable 47 side, as shown in FIG. 12. When the tilt of the optical disk 33 is detected in this state, the tilt motor 56 is driven so that the rotary force thereof is transmitted from the rotary shaft 56a to the tilt gear 57. By the rotation of the tilt gear 57, rotary force is transmitted from the gear portion 58a engaged with the tilt gear 57 to the tilt cam 58. Consequently, the tilt cam 58 is rotated according to the amount of the rotation of the tilt motor 56.

Figure 13:
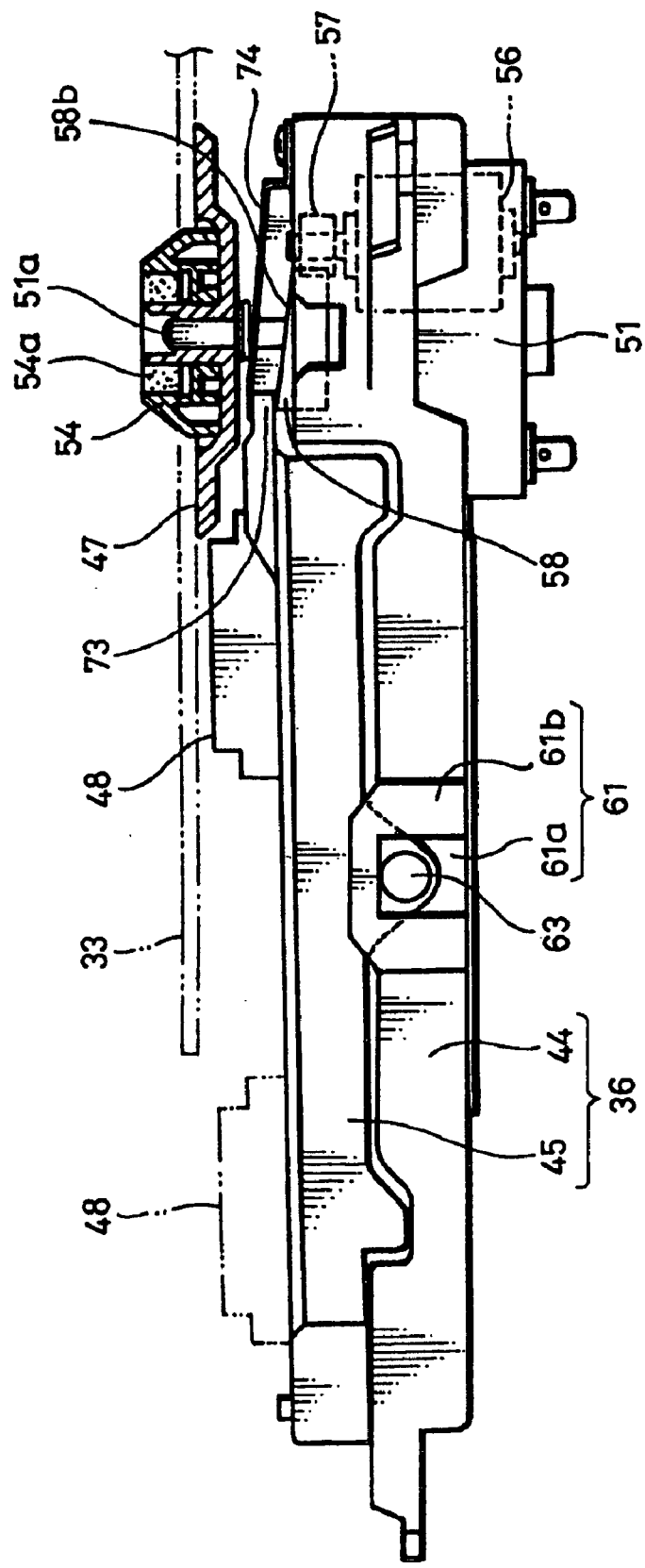
FIG. 13 is a side view showing the base chassis of the disk drive apparatus according to the present invention, illustrating a state in which the pick-up chassis is tilted rearward.
Figure 14:
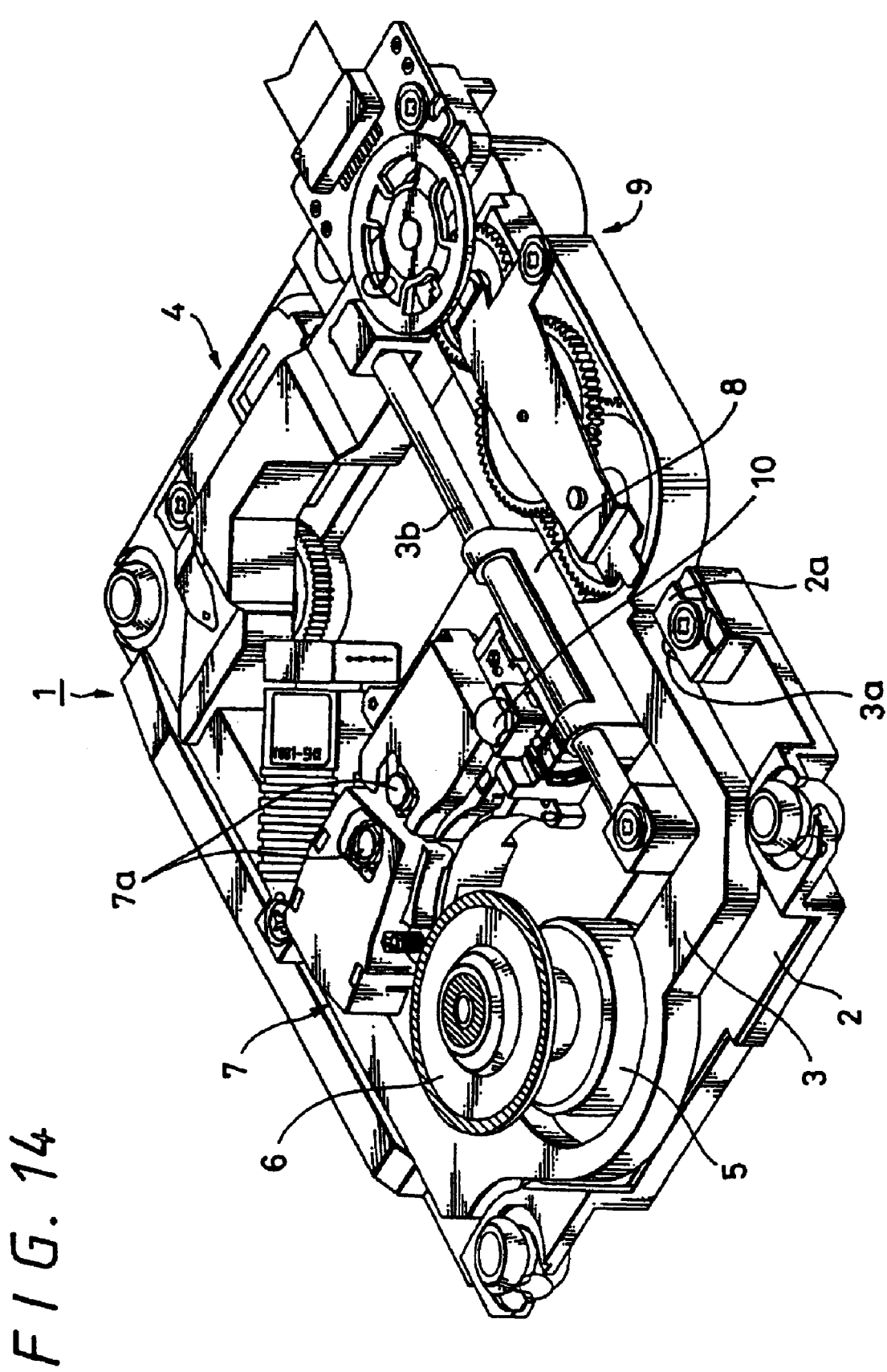
FIG. 14 is a perspective view showing a disk drive apparatus according to the prior art.

The pick-up chassis cam piece 73 is always biased onto the cam face 58b by the spring force of the leaf spring 74. As a result, the cam piece 73 is moved along the cam face 58b. Therefore, the pick-up chassis 45 is rotated via shaft portions 63, thereby changing its tilt attitude, as shown in FIG. 12. When the highest position of the cam face 58b comes in contact with the cam piece 73 by the rotation of the tilt cam 58, the pick-up chassis 45 is tilted rearward, as shown in FIG. 13. When the amount of tilt of the optical disk 33 is adjusted by the regulation of the tilt mechanism, the information signal recorded on the information recording face of the optical disk 33 is reproduced by the optical pick-up device 48. The information signal is reproduced by the optical pick-up device 48 in the following manner, for example. More specifically, a laser beam is irradiated from the objective lens 68a of the optical head 68 onto the information recording face. The reflected light of the laser beam is received through the objective lens 68a so that the information signal recorded on the information recording face is reproduced.

The operation reverse to that performed during the above-described loading operation is performed when the disk tray 13 is ejected. For example, when an eject button is pushed to select the eject operation, the loading motor 20 is rotated in the reverse direction. The loading motor 20 rotary force is transmitted to the rack 27a via the driving pulley 21, the rubber belt 22, the driven pulley 23 and the lower gear. Consequently, the chuck cam 27 is moved toward the loading motor 20 so that the cam pin 28 is pressed down. As a result, the base holder 14 is changed from the horizontal state, shown in FIG. 11, to the forward tilting state, shown in FIG. 10.

Hence, the base unit 15 supported on the base holder 14 is swung downward so that the turntable 47, on which is mounted the optical disk 33, is moved downward. By the downward operation of the turntable 47, the chuck plate 81 is disengaged. Subsequently, the turntable chucking ring 54 disengages the central hole 33a of the optical disk 33. Thus, the optical disk 33 is mounted on the disk housing portion 34 of the disk tray 13. As a result, the disk tray 13 can be ejected.

According to the present embodiment, the bearing portion 66b of the feed shaft 69 of the head feed mechanism is provided integrally with the base chassis 36. Therefore, the number of parts can be reduced. In addition, the fixing precision of the feed shaft 69 can be enhanced. Thus, a high precision feed mechanism can be implemented. Furthermore, the feed shaft 69 is housed within the thickness of the base chassis 36. Consequently, the size of both the head feed mechanism and the disk drive apparatus can be reduced. Moreover, the head feed mechanism can be used with a portable-type disk drive apparatus, as well as a stationary type.

The present invention is not restricted to the above-mentioned embodiment. While the example describes the optical disk as a CD, a CD-ROM or the like, as an information recording medium, a recordable optical disk or an optical magnetic disk can be applied as the information recording medium. Furthermore, while the example in which the optical disk, such as a CD, is used in a bare state has been described in the above-mentioned embodiment, an information recording medium housing an optical disk in a disk cartridge can be used.

Moreover, although the disk drive apparatus for reproducing (reading) the information recorded on an optical disk has been described in the above-mentioned embodiment, the present invention can be applied to a disk drive apparatus capable of recording and reproducing information, as well as a disk drive apparatus dedicated only for recording information.

Thus, the present invention is not restricted to the above-mentioned embodiment but can be variously changed without departing from the spirit and scope of the invention. While preferred embodiments of the present invention have been illustrated in detail, it is apparent that modifications and adaptations of the preferred embodiments will occur to those skilled in the art. However, it will be expressly understood that such modifications and adaptations are within the spirit and scope of the present invention as set forth in the following claims.

We claim:

1. A head feed mechanism comprising:
   a base chassis for rotationally supporting a turntable on which an optical disk for recording and/or reproducing information is loaded;
   an optical pick-up device for causing an optical head to face the optical disk loaded on the turntable in order to write and/or read the loaded information;
   a pick-up feed mechanism having a feed shaft for moving said optical pick-up device toward and away from said turntable, said feed shaft is a rotary shaft of a feed motor and supported on a bearing portion provided integrally with a pick-up chassis;
   a spindle chassis to chassis to which a spindle motor is fixed, said turntable being attached to said spindle motor, said pick-up chassis further comprising:
      a first side structural member and a second side structural member arranged opposite each other in first parallel planes;
      a front structural member and rear structural member arranged opposite each other in second parallel planes, the second parallel planes being perpendicular to the first parallel planes;
      an opening defined by at least said first side, said second side, said front and said rear structural members;
      said bearing portion integrally formed in a first portion of said first side structural member;
      a first hole, formed in a second portion of said first side structural member, positioned opposite said bearing portion;
      second and third holes formed in opposite ends of said second side structural member; a cam piece protruding from said second side structural member and in a direction perpendicular to said front structural member;
      a feed motor fixed to a front edge of said first side structural member, a bearing member provided on said feed motor fitted into said first hole; and
      a guide shaft extending between, and being supported by, said second and third holes.

2. A base chassis for a disk drive assembly head feed mechanism, comprising:
   a first side structural member and a second side structural member arranged opposite each other in first parallel planes;
   a third front structural member and a fourth rear structural member arranged opposite each other in second parallel planes, the second planes being perpendicular to the first planes;
   an opening defined by at least said first, second, third and fourth structural members;
   a bearing portion integrally formed in a first portion of said first side structure member;
   a first hole, formed in a second portion of said first side structural member, positioned opposite said bearing portion;
   second and third holes formed in opposite ends of said second side structural member;
   a feed shaft being a rotary shaft of a feed motor and supported on said bearing portion;
   said feed motor being fixed to a front edge of said first side structural member;
   a bearing member provided on said feed motor being fitted into said first hole; and
   a guide shaft extending between, and being supported by, said second and third holes.

3. A head feed mechanism comprising:
   a base chassis for rotationally supporting a turntable on which an optical disk for recording and/or reproducing information is loaded, the base chassis including a first side structural member and a second side structural member arranged opposite each other in first parallel planes, a third front structural member and a fourth rear structural member arranged opposite each other in second parallel planes, the second planes being perpendicular to the first planes, an opening defined by at least said first, second, third and fourth structural members, a bearing portion integrally formed in a first portion of said first side structural member, a first hole, formed in a second portion of said first side structural member, positioned opposite said bearing portion, second and third holes formed in opposite ends of said second side structural member, a feed shaft being a rotary shaft of a feed motor and supported on said bearing portion, said feed motor being fixed to a front edge of said first side structural member, a bearing member provided on said feed motor being fitted into said first hole and a guide shaft extending between, and being supported by, said second and third holes;
   an optical pick-up device for causing an optical head to face the optical disk loaded on the turntable in order to write and/or read the loaded information;

a pick-up feed mechanism having a feed shaft for moving said optical pick-up device toward and away from said turntable, said feed shaft is a rotary shaft of a feed motor and supported on a bearing portion provided integrally with a pick-up chassis;

a spindle chassis to which a spindle motor is fixed, said turntable being attached to said spindle motor, said pick-up chassis further comprising:

a first side structural member and a second side structural member arranged opposite each other in first parallel planes;

a front structural member and rear structural member arranged opposite each other in second parallel planes, the second parallel planes being perpendicular to the first parallel planes;

an opening defined by at least said first side, said second side, said front and said rear structural members; said bearing portion integrally formed in a first portion of said first side structural member;

a first hole, formed in a second portion of said first side structural member, positioned opposite said bearing portion;

second and third holes formed in opposite ends of said second side structural member; a cam piece protruding from said second side structural member and in a direction perpendicular to said front structural member;

a feed motor fixed to a front edge of said first side structural member, a bearing member provided on said feed motor fitted into said first hole; and a guide shaft extending between, and being supported by, said second and third holes.

* * * * *